Figure 1:
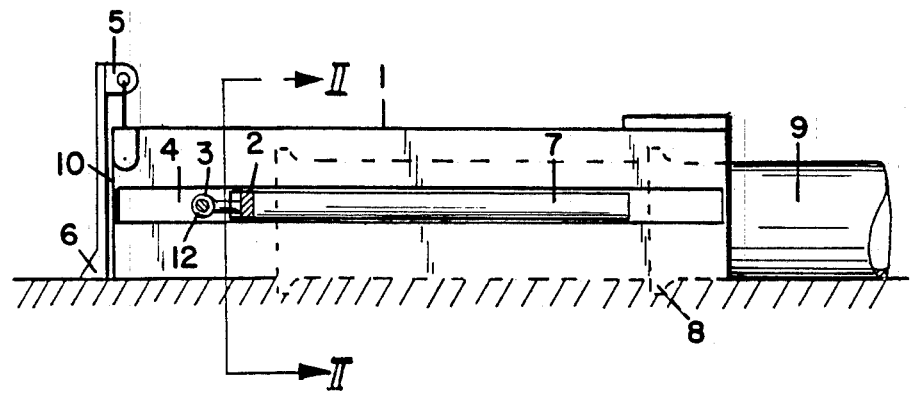

United States Patent [19]

Nielsen

[11] Patent Number: 4,576,514
[45] Date of Patent: Mar. 18, 1986

[54] DEVICE FOR LAYING OUT A PIPELINE

[76] Inventor: Karl I. Nielsen, Hundstrupvej 42, 5750 Ringe, Denmark

[21] Appl. No.: 459,694

[22] PCT Filed: May 19, 1982

[86] PCT No.: PCT/DK82/00044
§ 371 Date: Dec. 30, 1982
§ 102(e) Date: Dec. 30, 1982

[87] PCT Pub. No.: WO82/04110
PCT Pub. Date: Nov. 25, 1982

[51] Int. Cl.[4] .............................................. F16L 1/02
[52] U.S. Cl. .................................... 405/154; 405/170
[58] Field of Search ............... 405/154, 170, 184, 169, 405/174, 180

[56] References Cited

U.S. PATENT DOCUMENTS

| 3,113,628 | 12/1963 | Orcutt | 405/184 X |
| 3,204,417 | 9/1965 | Robley | 405/170 |
| 4,059,965 | 11/1977 | Stuckmann | 405/154 |

FOREIGN PATENT DOCUMENTS

| 122614 | 3/1972 | Denmark . |
| 1948051 | 4/1971 | Fed. Rep. of Germany . |
| 2519210 | 11/1976 | Fed. Rep. of Germany . |
| 1202304 | 8/1970 | United Kingdom . |
| 673797 | 7/1979 | U.S.S.R. . |

*Primary Examiner*—David H. Corbin
*Attorney, Agent, or Firm*—Merchant, Gould, Smith, Edell, Welter & Schmidt

[57] ABSTRACT

In order to lay down a pipeline, which consists of socket pipes (9), a device which consists of a frame with two side walls (1) can be used. On the outside of the side walls (1) there is mounted a number of engines (7) which can lead an intermediate cross member (2) to the front and to the rear of the frame.

Moreover there is in the front of the frame mounted a profile cutter (6) which can be led down into the underlying layer and excavate a bearing (8) for the socket. By means of this device an excavation can be made and a pipeline, which is supported in its full length, laid down. In this way even the strictest demands to laying down a pipeline can be complied with.

3 Claims, 2 Drawing Figures

U.S. Patent     Mar. 18, 1986     4,576,514

DEVICE FOR LAYING OUT A PIPELINE

This invention relates to a device for laying down a pipeline consisting of pipe sections, which are pushed together, the device comprising a frame which by means of a stress can be pushed forward in front of the spigot end.

A device of this type is described in Danish Patent No. 122.614. However, the device known from this patent is not well fitted in every respect. It has thus turned out to be difficult to make a precise steering when the device is pushed forward in the excavation, and it is also awkward to work with an indoor driving engine which takes up room for the operators, especially during the process of laying down the pipe sections. Besides it is difficult to handle the device accurately, as it can easily pivot on the pressure point at the spigot end.

It is the object of the present invention to meet the defects of the already known device, and according to the invention this is obtained, when the frame consists of two side walls between which there runs a cross member, which by means of one or more engines can be led to the rear of the frame. In this way a useful and even stress from the spigot end and to the two sides of the frame is obtained, by which means it turns out to be considerably easier to control the forward movement of the device in the excavation. This is especially due to the fact that the device can not rock around the pressure point. Furthermore no room is taken up inside the frame, and this facilitates the mounting of the pipe sections for the operators who are inside the frame.

By mounting a cutter in the front of the device, as referred to in claim 2, there can at the bottom of the excavation be produced a countersinking for the pipe socket. By these means a complete support of the whole pipe, and with it a complete support of the pipeline in its full length, is obtained. Consequently the pipe section rests on the whole of the underside contrary to the hitherto known device, according to which the pipe sections balance on the sockets.

Furthermore it is expedient, as referred to in claim 3, to place the engines on the outside of the frame, by which means the accomodation inside the frame will be the best possible.

Furthermore it is expedient, as referred to in claim 4, to operate the cutter by means of an engine, as it in this way can be operated by the staff in the frame at the proper place, i.e. where the next socket is to be placed.

In order to control the device during the pushing forward in the frame, it is an advantage, as referred to in claim 5, that the device can be directionally operated between the sides of the excavation by means of steering plates.

Figure 2:
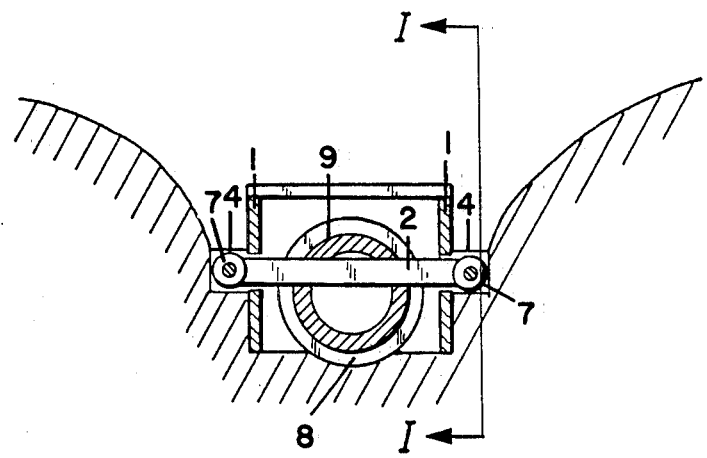

Below the invention will be further described with reference to the drawing, in which FIG. 1 shows the device partly in cross section and seen in the direction I—I in FIG. 2, and FIG. 2 shows the device seen in cross section in the direction II—II in FIG. 1.

In FIGS. 1 and 2 an embodiment of a device is shown. It consists of a frame constructed of two side walls 1, which in their front are provided with a front section 10. In both sides there is a longitudinally running slit, through which a cross member 2 is led. At its ends 3 outside the frame this cross member is fastened to the movable part of an engine 7, preferably a hydraulic cylinder. The stationary part of the engine is fastened to the side of the frame so the cross member can be led backwards and forwards in the frame, when the engine is operated. The engine 7 is protected by a cover 4 which are affixed to the sidewalls. Bushings 12 (only one shown) are likewise attached to the sidewalls. Ends 3 are maintained within said bushings 12 to form a mechanical link between the sidewalls 1 and engine 7.

In the front there is mounted a cutter 6, said cutter being functioning as a so-called dozer blade, which can be moved to a position below the level of the side members. The cutter 6 can have either a curved shape, corresponding to the outer form of the socket, or be plane. The cutter can be moved up and down preferably by means of an engine. Said cutter or dozer blade serves partly for levelling the bottom of the excavation and partly for pushing forward surplus levelling materials. Further it serves for excavation of the socket bearing.

In the front there can be mounted not shown steering plates, which are hinged to the vertical front edges of the side members, so that the steering plate can be moved a little of a lot out from the side of the frame. This is preferably done by means of hydraulic cylinders. By these means it is made possible to control the direction of the frame when the frame is moved forward.

Below the operation of the device is described. As shown in the drawing the pipeline is laid down in an excavation, the pipeline consisting of pipe sections 9 which, when they are laid down, are pushed together with a pipe which has been inserted in the socket of an already placed pipe. When operating the hydraulic engines the cross member is pressed down against the socket end of the latest placed pipe by means of which the pipes are pushed together and the frame is subsequently moved forward in the excavation.

Having reached the right position, the cutter is led downward at the same time as the frame is led forward. By these means a bearing 8 for the socket pipe is produced so the socket of the succeeding pipe can rest in the very bearing. Subsequently the cutter is raised again so it during its forward movement levels for the socket bearing in the right level after which the cross section is led forward in the stopped frame. The next pipe section can now be laid down in the excavation inside the frame with the socket on a level with its bearing, and the process can be repeated. In this way a pipe line, which is supported in its full length, can be laid down, by which means it is furthermore secured that no displacements or breakages of the pipelines can occur. In this way the strictest demands as to laying down pipelines can be complied with in a simple and at the same time fast way.

The device can if necessary be provided with a bottom plate, by which means soil is prevented from penetrating into the pipe assembly. This is especially advantageous at places where folding pipes with a base are laid down, or where the soil is so soft that it is not necessary to make an excavation for the sockets.

I claim:

1. A device for laying down a pipeline on land consisting of pipe sections which are pushed together, the device comprising:
   a frame of sufficient cross-section to encompass the diameter of a pipe section,
   a cutter mounted on the front of the frame and engageable with the earth below the frame to create a smooth bed for the pipe, a pair of engines having two parts movable relative to each other with one part connected to said frame, a cross member connected at each end to said other part of said engines and extending therebetween and located to engage an end of a pipe section when said engines are activated forcing the frame forward, so that said frame will be moved away from said pipe section in a longitudinal direction, thereby preparing the underlying bearing surface for said pipe section.

2. A device according to claim 1, characterized in that an engine (7) is mounted on the outside of each side wall (1).

3. A device according to claim 3 wherein said sidewalls includes longitudinal slots and wherein said cross member extends into said slots.

* * * * *